United States Patent
Schroeder et al.

(10) Patent No.: US 11,959,414 B2
(45) Date of Patent: Apr. 16, 2024

(54) GASEOUS FUEL RECIPROCATING ENGINE AND OPERATING METHODOLOGY FOR REDUCED HYDROGEN FLAME SPEED

(71) Applicant: Caterpillar Inc., Peoria, IL (US)

(72) Inventors: Eric Lee Schroeder, Germantown Hills, IL (US); Andrew Joseph Loetz, West Laffayette, IN (US); Jaswinder Singh, Dunlap, IL (US); Yongxian Gu, West Lafayette, IN (US); Jonathan William Anders, Peoria, IL (US); Naga Krishna Chaitanya Kavuri, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 15 days.

(21) Appl. No.: 17/702,292

(22) Filed: Mar. 23, 2022

(65) Prior Publication Data

US 2023/0304436 A1    Sep. 28, 2023

(51) Int. Cl.
  *F02B 43/12*    (2006.01)
  *F02B 19/12*    (2006.01)
  *F02B 19/18*    (2006.01)
  *F02F 3/28*    (2006.01)
  *F02M 21/02*    (2006.01)

(52) U.S. Cl.
  CPC .............. *F02B 43/12* (2013.01); *F02B 19/12* (2013.01); *F02B 19/18* (2013.01); *F02F 3/28* (2013.01); *F02M 21/0209* (2013.01); *F02M 21/023* (2013.01)

(58) Field of Classification Search
  CPC .......... F02B 43/12; F02B 19/12; F02B 19/18; F02F 3/28; F02M 21/0209; F02M 21/023
  See application file for complete search history.

(56) References Cited

U.S. PATENT DOCUMENTS

| | | | |
|---|---|---|---|
| 6,119,650 A * | 9/2000 | Tanigawa | F02B 19/04 123/268 |
| 6,640,773 B2 * | 11/2003 | Ancimer | F02D 41/403 123/299 |
| 6,675,748 B2 * | 1/2004 | Ancimer | F02B 43/00 123/526 |

(Continued)

FOREIGN PATENT DOCUMENTS

| | | |
|---|---|---|
| EP | 1701419 A1 | 9/2006 |
| JP | 09329026 A | 12/1997 |

(Continued)

OTHER PUBLICATIONS

Written Opinion and International Search Report for Int'l. Patent Appln. No. PCT/US2023/060061, dated Apr. 4, 2023 (12 pgs).

*Primary Examiner* — Xiao En Mo
(74) *Attorney, Agent, or Firm* — Brannon Sowers & Cracraft PC

(57) ABSTRACT

Operating a gaseous fuel engine includes spark-igniting gaseous hydrogen fuel and air, and propagating combustion gases of the spark-ignited mixture outwardly from a spark gap. The propagating combustion gases are impinged upon a cone surface of a piston so as to limit a flame area of the propagating combustion gases. Additional gaseous hydrogen fuel and air is ignited in the combustion cylinder by way of the propagating combustion gases to urge a piston toward a bottom-dead-center position.

20 Claims, 2 Drawing Sheets

(56) References Cited

U.S. PATENT DOCUMENTS

| | | | |
|---|---|---|---|
| 6,739,289 B2* | 5/2004 | Hiltner | F02B 43/10 |
| | | | 123/3 |
| 7,320,302 B2 | 1/2008 | Kobayashi | |
| 7,464,688 B2* | 12/2008 | Yu | F02D 41/3047 |
| | | | 123/299 |
| 8,469,009 B2* | 6/2013 | Munshi | F02D 19/081 |
| | | | 123/526 |
| 11,002,216 B1 | 5/2021 | Singh et al. | |
| 2003/0213461 A1* | 11/2003 | Regueiro | F02B 19/18 |
| | | | 123/262 |
| 2011/0253096 A1* | 10/2011 | Easley | F02B 23/0672 |
| | | | 123/294 |
| 2014/0331961 A1* | 11/2014 | Ness | F02B 23/0651 |
| | | | 123/294 |
| 2016/0265416 A1* | 9/2016 | Ge | B01J 12/007 |
| 2016/0341105 A1 | 11/2016 | Gu | |

FOREIGN PATENT DOCUMENTS

| | | |
|---|---|---|
| WO | 2004092556 A1 | 10/2004 |
| WO | 2014186136 A2 | 11/2014 |
| WO | 2015066651 A1 | 5/2015 |
| WO | 2015138987 A1 | 9/2015 |
| WO | 2016075361 A1 | 5/2016 |
| WO | 201816966 A1 | 9/2018 |
| WO | 2018169466 | 9/2018 |

* cited by examiner

GASEOUS FUEL RECIPROCATING ENGINE AND OPERATING METHODOLOGY FOR REDUCED HYDROGEN FLAME SPEED

STATEMENT OF GOVERNMENT INTEREST

This invention was made with government support under contract DE-EE0009422 awarded by DOE. The Government has certain rights in this invention.

TECHNICAL FIELD

The present disclosure relates generally to operating a gaseous fuel engine system, and more particularly to limiting a speed of combustion of gaseous hydrogen fuel and air during operation.

BACKGROUND

Gaseous fuel engines have been used throughout the world for many years in applications ranging from vehicle propulsion to production of electrical power and powering equipment such as pumps, compressors, and others. In a typical arrangement a feed of a gaseous fuel such as natural gas, methane, or various blends, is supplied into cylinders in the engine and ignited by way of a sparkplug. Traditional gaseous hydrocarbon fuels can produce certain undesired emissions and are susceptible to uncertainty in supply and cost.

More recently, increased engineering resources have been directed at exploiting alternative fuels, in particular gaseous hydrogen fuel. Gaseous hydrogen fuels can offer various advantages over traditional hydrocarbon fuels, including reduction or elimination of certain emissions. A variety of new challenges have been uncovered, however, in relation to efforts to operate combustion engines, in particular reciprocating engines, on gaseous molecular hydrogen and blends thereof. Hydrogen tends to burn at a significantly higher flame speed than traditional gaseous hydrocarbon fuels. Among other things, the higher flame speed can result in increased peak cylinder pressures and potentially wear and tear on various components, as well as a heightened likelihood of pre-ignition. One known strategy for operating a spark-ignited engine employing in at least some capacity hydrogen is set forth in WO2014053167A1.

SUMMARY

In one aspect, a method of operating a gaseous fuel engine includes spark-igniting a mixture containing gaseous hydrogen fuel and air at a spark gap in a gaseous fuel engine, and propagating combustion gases of the spark-ignited mixture outwardly from the spark gap in a combustion cylinder in the gaseous fuel engine. The method further includes limiting a flame area of combusting gaseous hydrogen fuel and air in the combustion cylinder by way of a cone surface of a piston, and urging the piston in the gaseous fuel engine toward a bottom-dead-center position based on an increase in pressure in the combustion cylinder caused by combustion of the gaseous hydrogen fuel and air In another aspect, a gaseous fuel engine system includes a fuel system having a gaseous hydrogen fuel supply, and a gaseous hydrogen fuel admission valve. The gaseous fuel engine system further includes an engine coupled to the fuel system and including an engine housing having a combustion cylinder formed therein, and a piston movable within the combustion cylinder between a top-dead-center position and a bottom-dead-center position. The piston includes a combustion face having a piston outer rim surface extending circumferentially around a combustion bowl, and a center cone within the combustion bowl having a cone surface extending between a cone peak centered on a piston center axis and a combustion bowl floor. The gaseous fuel engine system further includes an igniter having formed therein a combustion prechamber and outlets fluidly connecting the combustion prechamber to the combustion cylinder, and including spark electrodes forming a spark gap within the combustion prechamber. The outlets are spaced circumferentially around the piston center axis and oriented to direct combustion gases of an ignition charge from the combustion prechamber radially outward and axially downward from the igniter toward the cone surface when the piston is at the top-dead-center position.

In still another aspect, a method of controlling combustion speed in a reciprocating hydrogen engine includes propagating a combustion flame of ignited gaseous hydrogen fuel outwardly in a combustion cylinder from an igniter, and impinging the combustion flame upon a cone surface of a piston in the combustion cylinder. The method further includes limiting a flame area of the combustion flame exposed to additional gaseous hydrogen fuel in the combustion cylinder based on the impinging the combustion flame upon a cone surface, and slowing a speed of combustion of gaseous hydrogen fuel in the combustion cylinder based upon the limiting a flame area of the combustion flame.

DETAILED DESCRIPTION

Figure 1:
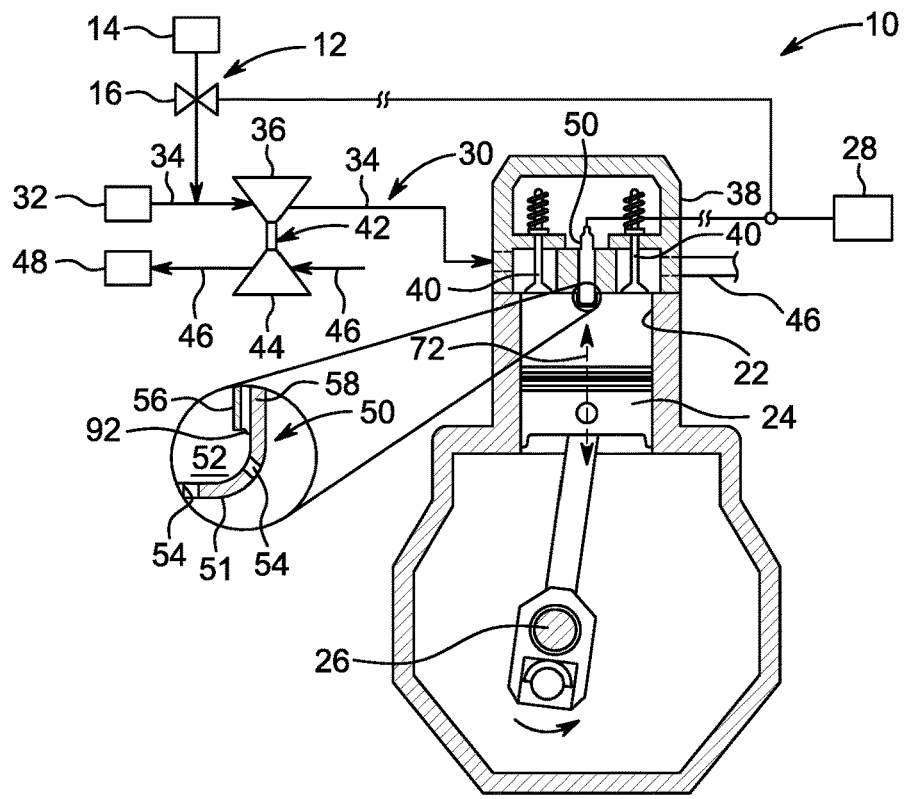
FIG. 1 is a side diagrammatic view, including a detailed enlargement, of a gaseous fuel engine system, according to one embodiment.

Referring to FIG. 1, there is shown a gaseous fuel engine system 10, according to one embodiment. Engine system 10 includes a fuel system 12 having a gaseous hydrogen fuel supply 14, and a gaseous hydrogen fuel admission valve 16. Fuel supply 14 may store gaseous molecular hydrogen in a compressed gaseous state, for example, or could receive a feed of gaseous molecular hydrogen from a reformer or another source of gaseous hydrogen. Fuel supply 14 could also store or produce various gaseous fuel blends, such as a blend of gaseous molecular hydrogen and a gaseous hydrocarbon fuel such as natural gas, methane, ethane, landfill gas, biogas, or still another. In a practical implementation engine system 10 is structured to operate, at least at times, on a gaseous hydrogen fuel consisting essentially of gaseous molecular hydrogen.

Engine system 10 further includes an engine 18 coupled to fuel system 12. Engine 18 includes a reciprocating engine, and can be understood as a reciprocating hydrogen engine, including an engine housing 20 or cylinder block having a combustion cylinder 22 formed therein. A piston 24 is movable within combustion cylinder 22 between a top-dead-center position and a bottom-dead-center position to rotate a crankshaft 26, typically in a conventional four-stroke engine cycle. Piston 24 may be one of a plurality of pistons each movable within one of a plurality of combustion cylinders in engine housing 20, with the combustion cylinders having any number and in any suitable arrangement such as a V-pattern, an in-line pattern, or still another.

Engine system 10 further includes an intake system 30 having a fresh air inlet 32, and an intake conduit 34 extending from fresh air inlet 32 to an engine head 38 attached to engine housing 20. A compressor 36 of a turbocharger 42 is within intake conduit 34 and operable to pressurize a feed of air and admitted gaseous hydrogen fuel by way of admission valve 16 for feeding the same to combustion cylinder 22. In other embodiments, engine 18 could be port-injected, manifold-injected, or potentially even direct-injected with gaseous hydrogen fuel. Intake system 30 may also include an intake manifold (not shown) structured to distribute feeds of compressed intake air and gaseous hydrogen fuel amongst a plurality of combustion cylinders in engine 18. An exhaust conduit 46 extends from engine head 38, to a turbine 44 of turbocharger 42 and thenceforth to an exhaust outlet 48 such as an exhaust stack or tailpipe. An exhaust manifold (not shown) is also typically provided to collect feeds of exhaust from a plurality of combustion cylinders. Engine valves 40 are supported in engine head 38 and movable to control fluid communications between combustion cylinder 22 and intake conduit 34 and exhaust conduit 46 according to conventional practices.

Figure 2:
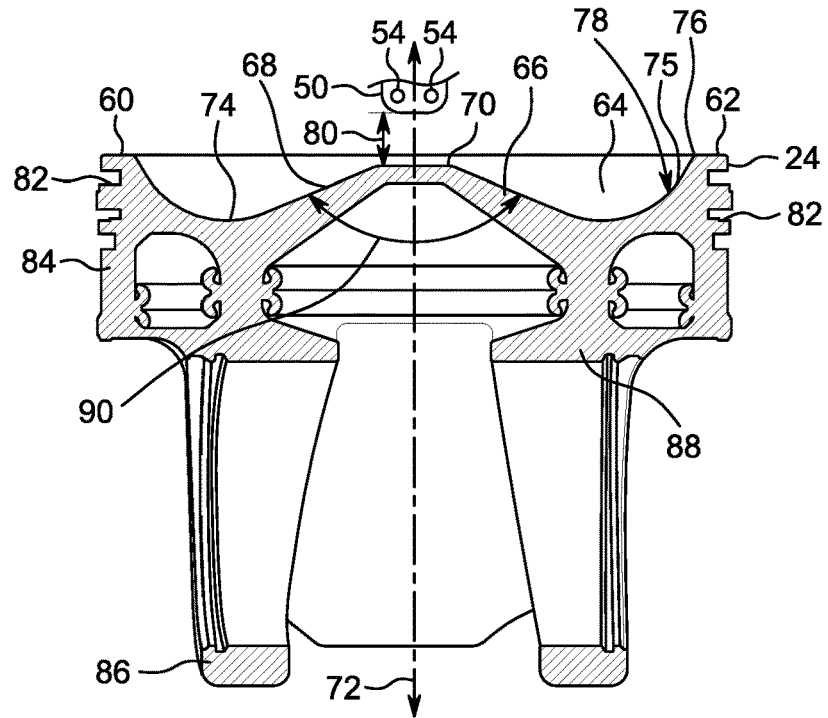
FIG. 2 is a sectioned side diagrammatic view of a piston, according to one embodiment.

Referring also now to FIG. 2, engine system 10 also includes an igniter 50. Igniter 50 includes an igniter tip 51 extending into combustion cylinder 22, and having formed therein a combustion prechamber 52 and a plurality of outlets 54 fluidly connecting combustion prechamber 52 to combustion cylinder 22. The term "outlets" is used herein as a matter of convenience, as outlets 54 may serve both to admit a mixture containing gaseous hydrogen fuel and air into combustion prechamber 52 and also enabling expelling combustion gases of an ignition charge from prechamber 52 to combustion cylinder 22, as further discussed herein. In alternative embodiments igniter 50 might not be directly positioned in combustion cylinder 22 and could instead be recessed in engine head 38, for example. Igniter 50 might also be offset instead of centrally located, oriented at an angle, or have other variations from the illustrated embodiment. Igniter 50 further includes spark electrodes 56 and 58 forming a spark gap 92 within combustion prechamber 52. Spark electrode 56 may include an electrode prong and spark electrode 58 may include tip 51 of igniter 50. The present disclosure could implement other spark-ignition strategies and sparkplug configurations, for example a J-gap sparkplug, any of a variety of surface or radial-gap sparkplugs, or still another sparkplug apparatus. The present disclosure is not limited with regard to spark electrode configuration, materials, number of spark gaps, polarity of electrodes, et cetera.

Igniter 50 and combustion prechamber 52 may be non-enriched, meaning all of the fuel ignited in igniter 50 in an ignition charge is supplied into combustion prechamber 52 by urging a mixture containing gaseous fuel and air from combustion cylinder 22 into combustion prechamber 52 by way of moving piston 24 toward a top-dead-center position in combustion cylinder 22. In other instances, combustion prechamber 52 could be enriched, employing a direct feed of a pilot fuel or ignition fuel, potentially gaseous hydrogen fuel, that is independent of the operation of piston 24.

Outlets 54 may include any number, for example a number from three to eight. Outlets 54 may be spaced circumferentially around a piston center axis 72 and oriented to direct combustion gases radially outward and axially downward from igniter 50 to assist, in cooperation with piston 24, in limiting a flame area of propagating combustion gases, thusly slowing a speed of combustion of a main charge of gaseous hydrogen fuel and air in combustion cylinder 22 as further discussed herein.

Focusing still on FIG. 2, piston 24 includes a combustion face 60 having a piston outer rim surface 62 extending circumferentially around a combustion bowl 64, and a center cone 66 within combustion bowl 64 having a cone surface 68 extending between a cone peak 70 centered on piston center axis 72 and a combustion bowl floor 74. A "cone surface" herein means a surface that defines a complete conical shape, or a partial conical shape such as a frusto-conical shape. A generally conoidal surface may be considered a cone surface within the present context, although spherical, hemispheric, flat surfaces cannot. Combustion face 60 may further include a combustion bowl outer wall 75 extending from combustion bowl floor 74 to a combustion bowl edge 76 transitioning with piston outer rim surface 62. Combustion bowl outer wall 75 may define one or two radiuses 78 of curvature, in profile, between combustion bowl floor 74 and combustion bowl edge 76. The number and size of the one or more radiuses 78 of curvature and overall bowl shape can assist in providing a desired piston compression ratio in service in engine 18. In some instances, more than two radiuses of curvature or other modifications to combustion bowl geometry could impact compression ratio undesirably, or complicate manufacturing. Combustion bowl 64 may have a uniform profile of rotation circumferentially around piston center axis 72 although the present disclosure is not strictly limited as such.

In the illustrated embodiment a clearance 80 is defined between igniter 50 and cone peak 70. Clearance 80 may be 5 millimeters or less when piston 24 is at the top-dead-center position, and potentially 4 millimeters or less, approximately as depicted in FIG. 2. The relatively small clearance can assist in positioning piston features in sufficient proximity to igniter 50 to enable interaction with propagating combustion gases and a combustion flame as further discussed herein. It will be appreciated that combustion bowl 64 may be understood as non-reentrant. Piston 24 may also include ring grooves 82 extending circumferentially around a crown piece 84 attached, such as by friction welding, to a skirt piece 86 having a wrist pin bore 88 formed therein. Cone surface 68 may define an included cone angle 90 that is from 100° to 150°.

As discussed above, gaseous hydrogen fuel has an extremely high laminar flame speed compared to certain other fuels, such as natural gas, at similar air-fuel ratios. In a spark-ignited engine, high laminar flame speed can lead to excessive peak cylinder pressures, excessive sparkplug wear from retarded ignition timings intended to mitigate high peak cylinder pressures, and potentially an increased risk of pre-ignition from the retarded ignition timings. Engine damage can also be observed when combusting hydrogen due to high rates of cylinder pressure rise. As a result, efforts at burning hydrogen in traditional gaseous fuel engine designs have been observed to require running the engine at air-fuel ratios that are leaner than optimally desired in an effort to slow down the rate of heat release. Operating at leaner air-fuel ratios can require increased boost pressure, however, due to limitations on the capacity of a turbocharger to provide boost hydrogen fueling rate must be decreased from what would otherwise be desirable. Operating a reciprocating hydrogen engine can thus require power output to be relatively less than what might be available as compared to a baseline natural gas power level. This so-called de-rating of the engine is undesirable for various reasons. According to the present disclosure, employing pistons having certain piston geometries can slow combustion speed of hydrogen and reduce or eliminate the need to derate the engine.

Figure 3:
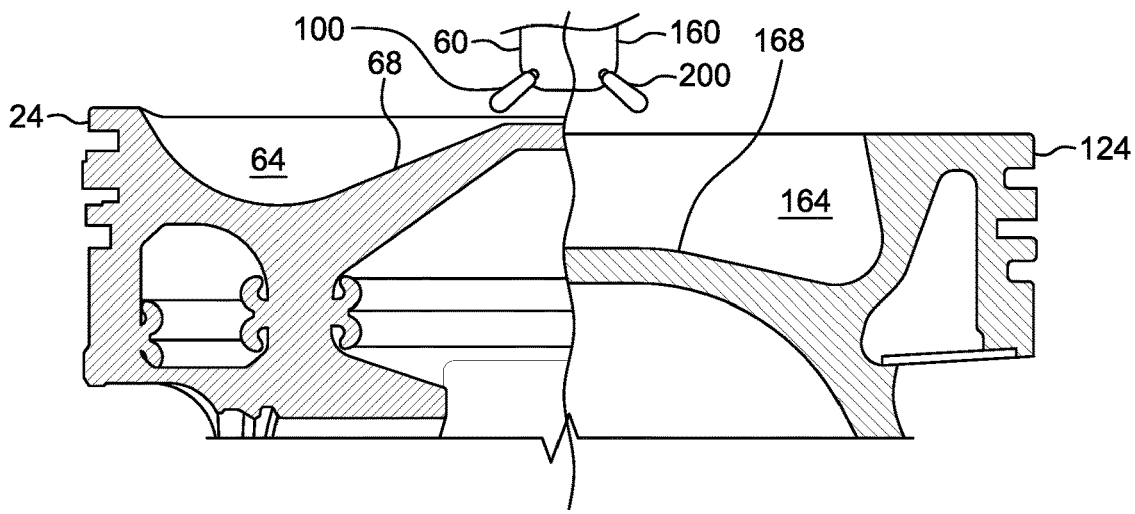
FIG. 3 is a sectioned diagrammatic view comparing a known combustion strategy to the present disclosure, at a first operating stage.
Figure 4:
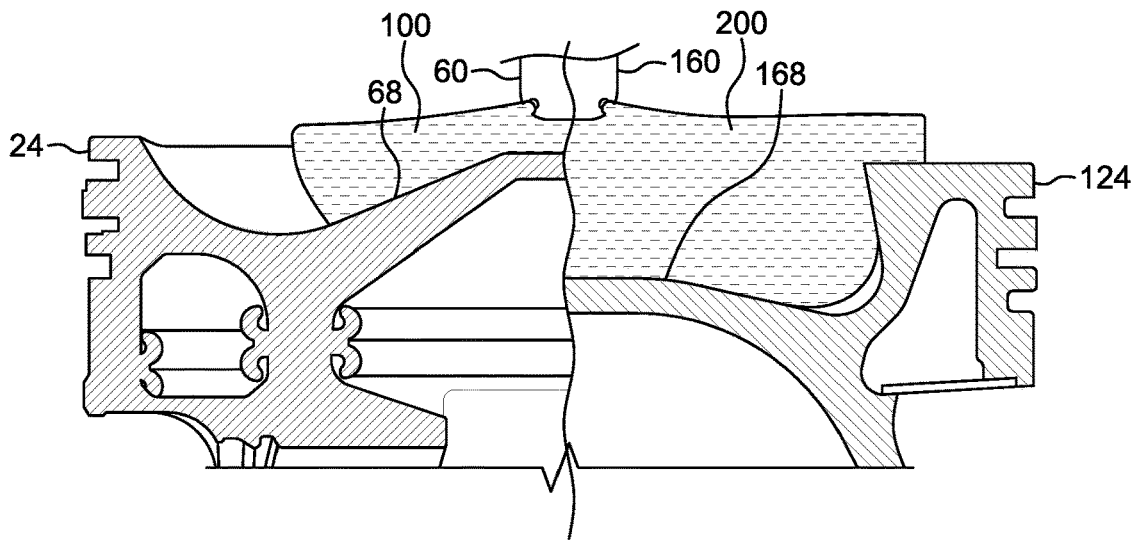
FIG. 4 is a sectioned diagrammatic view comparing a known combustion strategy to the present disclosure at a second operating stage.

Referring now to FIG. 3, there is shown on the left-hand side of the drawing piston 24 according to the present disclosure, in comparison to a known gaseous fuel engine piston 124 on the right-hand side of the drawings. Igniter 60 is shown in the left-hand side of the drawing as it might appear having spark-ignited a mixture containing gaseous hydrogen fuel and air at spark gap 92, and combustion gases of the spark-ignited mixture beginning to propagate outwardly from spark gap 92 and igniter 50. The spark-ignited mixture may consist essentially of gaseous hydrogen fuel and air, although blends as discussed herein are within the scope of the present disclosure. On the right-hand side of FIG. 3 combustion gases 200 are shown having been spark-ignited and propagating outwardly from an igniter 160. The difference in combustion bowl shapes in piston 24 as compared to piston 124 are readily apparent. Piston 24 includes within combustion bowl 64 cone surface 68. Piston 124 does not include a center cone or a cone surface at all, but instead includes a generally hemispheric or domed surface 168 positioned relatively further from igniter 160, and less capable or incapable of interacting with propagating combustion gases 200 and a combustion flame produced thereby early in a combustion cycle. At least initially the propagating combustion gases 100 and 200 have the form of jets that advance toward and into the respective combustion bowls 64 and 164. Combusting gases of the ignition charges rapidly form a combustion flame or flame front in the respective cylinders, igniting additional gaseous hydrogen fuel and air of a main charge. The main charge may consist essentially of gaseous hydrogen fuel and air, although as discussed herein various blends are within the scope of the present disclosure.

Focusing now on FIG. 3, there is shown piston 24 in comparison to piston 124 after the combustion flames have further propagated to advance further into the respective combustion bowls 64 and 164. It can be seen that the combustion flame 100 in piston 24 has impinged upon cone surface 68. It will be appreciated that by structuring piston 124 appropriately a flame area of the combustion flame is limited by being shielded from additional gaseous hydrogen fuel and air of a main charge in combustion cylinder 22 by contact with cone surface 68 of center cone 66. In the case of piston 124 no such shielding and limitation to flame area has occurred, and additional gaseous hydrogen fuel of a main charge has ignited almost entirely. Thus, while in either case additional gaseous hydrogen fuel and air in the combustion cylinder is ignited by a propagating combustion flame, the progression of combustion of the main charge is slowed in piston 24 versus piston 124. This phenomenon results in slowing the speed of combustion in engine 18 employing piston 24 as compared to an engine employing piston 124.

Figure 5:
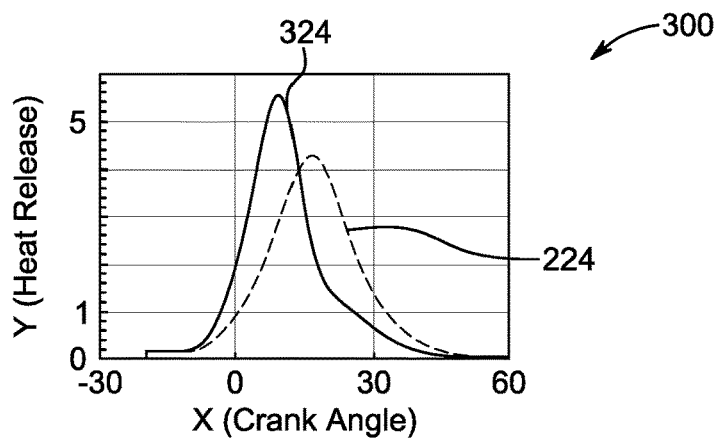
FIG. 5 is a graph of heat release comparing a known combustion strategy to the present disclosure.

Focusing now on FIG. 5, there is shown a graph 300 of crank angle degrees on the X-axis in comparison to expected heat release on the Y-axis for a reciprocating hydrogen engine using a piston according to the present disclosure in a trace 224 in comparison to a reciprocating hydrogen engine using a piston the same or similar to piston 124 in a trace 324. It can be seen that heat release according to trace 224 is slower than heat release according to trace 324, and that a peak heat release in trace 224 is less in magnitude than a peak heat release in trace 324.

INDUSTRIAL APPLICABILITY

Those skilled in the art will appreciate that conventional natural gas or other gaseous hydrocarbon fuel engines commonly include pistons that are optimized for rapid flame speeds. According to the present disclosure, pistons may be optimized to reduce heat release rate, for reduced flame speed, and allow for relatively increased power within limitations of the intake system, including limitations of a turbocharger compressor to provide boost. As discussed above, propagating a combustion flame can include impinging the combustion flame against a cone surface of a center cone of a piston. The combustion flame may include a flame area that is exposed to gaseous hydrogen fuel and air at some locations but limited in flame area by being shielded at other locations in contact with the cone surface.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating a gaseous fuel engine comprising:
   spark-igniting a mixture containing gaseous hydrogen fuel and air at a spark gap in a gaseous fuel engine;
   propagating combustion gases of the spark-ignited mixture outwardly from the spark gap in a combustion cylinder in the gaseous fuel engine;
   limiting a flame area of combusting gaseous hydrogen fuel and air in the combustion cylinder by way of contacting some of the propagating combustion gases to a cone surface of a piston; and
   urging the piston in the gaseous fuel engine toward a bottom-dead-center position based on an increase in pressure in the combustion cylinder caused by combustion of the gaseous hydrogen fuel and air.

2. The method of claim 1 wherein the spark-igniting a mixture containing gaseous hydrogen fuel and air includes spark-igniting an ignition charge in a combustion prechamber of an igniter.

3. The method of claim 2 wherein the propagating combustion gases includes propagating the combustion gases radially outward and axially downward from outlets in the igniter, and wherein the cone surface is upon a center cone of the piston centered on a piston center axis.

4. The method of claim 3 wherein the limiting a flame area includes impinging the combusting gases upon the cone surface within a combustion bowl formed in the piston.

5. The method of claim 4 wherein the cone surface defines an included angle from 100° to 150°.

6. The method of claim 5 wherein the cone surface extends radially outward and axially downward to a combustion bowl floor transitioning to a combustion bowl outer wall extending radially outward and axially upward to a piston outer rim surface.

7. The method of claim 6 wherein the combustion bowl is non-reentrant.

8. The method of claim 2 further comprising urging the mixture containing gaseous hydrogen fuel and air from the combustion cylinder into the combustion prechamber to form the ignition charge by way of moving the piston toward a top-dead-center position in the combustion cylinder.

9. The method of claim 8 wherein the combustion prechamber is non-enriched and formed in a tip of the igniter extending into the combustion cylinder.

10. A gaseous fuel engine system comprising:
a fuel system including a gaseous hydrogen fuel supply, and a gaseous hydrogen fuel admission valve;
an engine coupled to the fuel system and including an engine housing having a combustion cylinder formed therein, and a piston movable within the combustion cylinder between a top-dead-center position and a bottom-dead-center position, and the piston including a combustion face having a piston outer rim surface extending circumferentially around a combustion bowl, and a center cone within the combustion bowl having a cone surface extending between a cone peak centered on a piston center axis and a combustion bowl floor;
an igniter having formed therein a combustion prechamber and outlets fluidly connecting the combustion prechamber to the combustion cylinder, and including spark electrodes forming a spark gap within the combustion prechamber; and
the outlets being spaced circumferentially around the piston center axis and oriented, when the piston is at the top-dead-center position, to direct combustion gases of an ignition charge from the combustion prechamber in paths from the outlets that each advance both radially outward and axially downward from the igniter into contact with the cone surface.

11. The gaseous fuel engine system of claim 10 wherein the cone surface defines an included angle from 100° to 150°.

12. The gaseous fuel engine system of claim 11 wherein the combustion face includes a combustion bowl outer wall extending from the combustion bowl floor to a combustion bowl edge transitioning to the piston outer rim surface, and defines one or two radiuses of curvature, in profile, between the combustion bowl floor and the combustion bowl edge.

13. The gaseous fuel engine system of claim 12 wherein the combustion bowl is non-reentrant.

14. The gaseous fuel engine system of claim 11 wherein the center cone includes a cone peak, and a clearance of 5 millimeters or less is defined between the cone peak and the igniter when the piston is at the top-dead-center position.

15. The gaseous fuel engine system of claim 10 wherein the combustion prechamber in the igniter is non-enriched.

16. A method of controlling combustion speed in a reciprocating hydrogen engine comprising:
propagating a combustion flame of ignited gaseous hydrogen fuel outwardly in a combustion cylinder from an igniter;
impinging the combustion flame upon a cone surface of a piston in the combustion cylinder during the propagating a combustion flame;
limiting a flame area of the combustion flame exposed to additional gaseous hydrogen fuel in the combustion cylinder, such that some of the flame area is in contact with the additional gaseous hydrogen fuel and some of the flame area is in contact with the cone surface, based on the impinging the combustion flame upon a cone surface; and
slowing a speed of combustion of gaseous hydrogen fuel in the combustion cylinder based upon the limiting a flame area of the combustion flame.

17. The method of claim 16 wherein the impinging the combustion flame includes impinging the combustion flame upon a cone surface of a center cone defining an included angle from 100° to 150°.

18. The method of claim 17 wherein the propagating a combustion flame includes propagating jets of combustion gases of an ignition charge outwardly from openings in the igniter fluidly connecting a combustion prechamber to the combustion cylinder.

19. The method of claim 16 wherein the slowing a speed of combustion includes slowing a speed of combustion of a main charge consisting essentially of gaseous hydrogen and air.

20. The method of claim 19 further comprising spark-igniting the ignition charge, and the ignition charge consists essentially of gaseous hydrogen and air.

* * * * *